United States Patent
Kassemi et al.

(10) Patent No.: US 12,192,158 B2
(45) Date of Patent: *Jan. 7, 2025

(54) EMAIL BASED E-COMMERCE USING EMBEDDED FORMS

(71) Applicant: SWOOP IP HOLDINGS LLC, Wilmington, DE (US)

(72) Inventors: James Kassemi, Albuquerque, NM (US); Chad Person, Albuquerque, NM (US); John P. Killoran, Jr., Albuquerque, NM (US); Patrick Killoran, Jackson Heights, NY (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 274 days.

This patent is subject to a terminal disclaimer.

(21) Appl. No.: 17/967,207

(22) Filed: Oct. 17, 2022

(65) Prior Publication Data

US 2023/0034935 A1    Feb. 2, 2023

Related U.S. Application Data

(63) Continuation of application No. 16/371,296, filed on Apr. 1, 2019, now Pat. No. 11,502,981, which is a continuation of application No. 14/592,624, filed on Jan. 8, 2015, now Pat. No. 10,250,535.

(60) Provisional application No. 61/926,696, filed on Jan. 13, 2014, provisional application No. 61/925,600, filed on Jan. 9, 2014, provisional application No. 61/925,409, filed on Jan. 9, 2014, provisional application No. 61/925,175, filed on Jan. 8, 2014, provisional application No. 61/925,173, filed on Jan. 8, 2014.

(51) Int. Cl.
*H04L 51/08* (2022.01)
*H04L 9/40* (2022.01)

(52) U.S. Cl.
CPC .............. *H04L 51/08* (2013.01); *H04L 63/08* (2013.01); *H04L 63/168* (2013.01); *H04L 2463/102* (2013.01)

(58) Field of Classification Search
CPC .......... H04L 51/08; H04L 63/08; H04L 51/07
USPC ....................................................... 709/206
See application file for complete search history.

(56) References Cited

U.S. PATENT DOCUMENTS

| 6,101,485 | A | 8/2000 | Fortenberry et al. |
| 6,167,435 | A | 12/2000 | Druckenmiller et al. |
| 8,060,414 | B1 | 11/2011 | Lin et al. |
| 8,489,507 | B1 | 7/2013 | Dayalan |

(Continued)

*Primary Examiner* — Vivek Srivastava
*Assistant Examiner* — Hien V Doan
(74) *Attorney, Agent, or Firm* — VOLPE KOENIG (57) ABSTRACT

A method implemented in an e-commerce system to facilitate transactions between a customer and a vendor using embedded forms includes requesting by a vendor system to an e-commerce system to generate an embedded form for use in an SMTP email campaign. The method further includes transmitting emails with embedded forms including at least one token by the vendor system to a customer device. The method further includes rendering the embedded form in email to the customer device and receiving a response email, wherein the response email includes input details requested in the specified input fields and a token; authenticating the response email; decoding the token and processing a transaction based on the customer input details requested in the specified input fields of the embedded form.

16 Claims, 9 Drawing Sheets

(56) References Cited

U.S. PATENT DOCUMENTS

| | | |
|---|---|---|
| 8,538,845 B2 | 9/2013 | Liberty |
| 8,606,703 B1 | 12/2013 | Dorsey et al. |
| 8,725,635 B2 | 5/2014 | Klein et al. |
| 8,762,272 B1 | 6/2014 | Cozens et al. |
| 9,189,785 B2 | 11/2015 | Liberty et al. |
| 9,208,488 B2 | 12/2015 | Liberty |
| 9,892,386 B2 | 2/2018 | Liberty |
| 10,395,223 B2 | 8/2019 | Muthu et al. |
| 10,515,345 B2 | 12/2019 | Koh et al. |
| 2002/0013774 A1 | 1/2002 | Morimoto |
| 2006/0253335 A1 | 11/2006 | Keena et al. |
| 2007/0255620 A1 | 11/2007 | Tumminaro et al. |
| 2009/0006233 A1 | 1/2009 | Chemtob |
| 2010/0070419 A1 | 3/2010 | Vadhri |
| 2012/0130898 A1 | 5/2012 | Snyder et al. |
| 2012/0253896 A1 | 10/2012 | Killoran, Jr. |
| 2014/0082726 A1 | 3/2014 | Dreller |

EMAIL BASED E-COMMERCE USING EMBEDDED FORMS

CROSS REFERENCE TO RELATED APPLICATION

This application is a continuation of U.S. patent application Ser. No. 16/371,296 filed Apr. 1, 2019, which is a continuation of U.S. patent application Ser. No. 14/592,624 filed Jan. 8, 2015, which issued on Apr. 2, 2019 as U.S. Pat. No. 10,250,535, which claims the benefit of U.S. provisional application No. 61/925,173, filed Jan. 8, 2014, U.S. provisional application No. 61/925,175, filed Jan. 8, 2014, U.S. provisional application No. 61/925,409, filed Jan. 9, 2014, U.S. provisional application No. 61/925,600, filed Jan. 9, 2014 and U.S. provisional application No. 61/926,696, filed Jan. 13, 2014 which are incorporated by reference as if fully set forth.

FIELD OF INVENTION

The present invention is related to e-commerce.

BACKGROUND

One of the key tools of online marketing is email advertisements. According to many current approaches to electronic commerce (e-commerce), a customer may register with a vendor (such as an online retailer, nonprofit organization, stock trader etc.) to receive emails that provide information about products that are offered for sale by the vendor, make a payment, solicit instructions to redistribute funds or reallocate financial resources. The emails may include links that direct the user to web pages on the vendor's web site. At the web site, the customer may obtain additional information about and/or purchase the products described in the emails. Industry standards have produced fundamental limits on how email could be used.

Within this technological climate, email still remains a perennial technology for messages. Many use email in tandem with other networks and for more official correspondence. The vast majority of services, websites, social networks and online retailers require an email address as a basis for joining and confirming identity. Email advertising is an underutilized tool that is too often thought of as a place to write messages and correspond with others, or as a way to advertise to potential customers. A way to sell products or to perform a financial transaction by email alone has not been developed.

Additionally, email does not reflect the same level of interactivity that is available online. The email format has not kept pace with the advancements found on websites and social media. Email users are limited to clicking links, adding text and including attachments. Email lacks the interactive quality that exists on websites. Emails cannot offer an interactive form that allows for: multiple inputs and calculations to be made within the email, adjustable visual elements, interactive graphics, voice recognition, Google glass, swipes, retinal or fingerprint recognition as an example. For this reason, email is perceived as a more stagnant arena in comparison to other online arenas. The design and the content of email are generally limited by system standards.

SUMMARY

A method to implement in an e-commerce system to facilitate transactions between a customer and a vendor using embedded forms comprised of a vendor system, a customer device and an e-commerce system. The vendor system starts an email campaign, using embedded forms; the vendor system transmits a request to generate an embedded form to a form monitor server and the form monitor server is associated with the e-commerce system. The form monitor server receives the request to generate the embedded form and requests the token manager associated with the e-commerce system to generate the tokens. The form monitor server generates the embedded form including the tokens and transmits to the vendor system. The vendor system transmits the embedded form with tokens in an email campaign and transmits to the customer device. The customer opens the received email using customer device and the customer device renders the embedded form within the email environment. The customer device provides an input selection and confirms that the input selections are complete in the embedded and a response email is generated. The response email is transmitted to the e-commerce system. The e-commerce system receives the response email and authenticates the response email. The token manager associated with the e-commerce system requests the customer's input details and decodes the token, and further authenticates the sender of the response email, which allow the transaction to be processed. The form monitor provides the customer's input details to the token manager. Once the details are confirmed, the e-commerce system processes the payment and notifies the vendor system of a successful transaction.

A method implemented in an e-commerce system to facilitate transactions between a customer and a vendor using embedded forms is disclosed. The method includes generating a form for use in an SMTP email campaign; generating at least one token and form information, wherein the token includes at least a type field and amount field, wherein the form information is configured to interact with an email client to automatically render a form with specified input fields; transmitting the token and the form information; receiving customer input details from the email client in an HTTP format; receiving a response email, wherein the response email includes input details requested in the specified input fields and a token; authenticating the response email; decoding the token; and processing a transaction, based on the customer input details and the response email.

BRIEF DESCRIPTION OF THE DRAWINGS

A more detailed understanding may be had from the following description, given by way of example in conjunction with the accompanying drawings wherein:

FIG. 5 is an electronic page for requesting payment;

DETAILED DESCRIPTION

Figure 1:
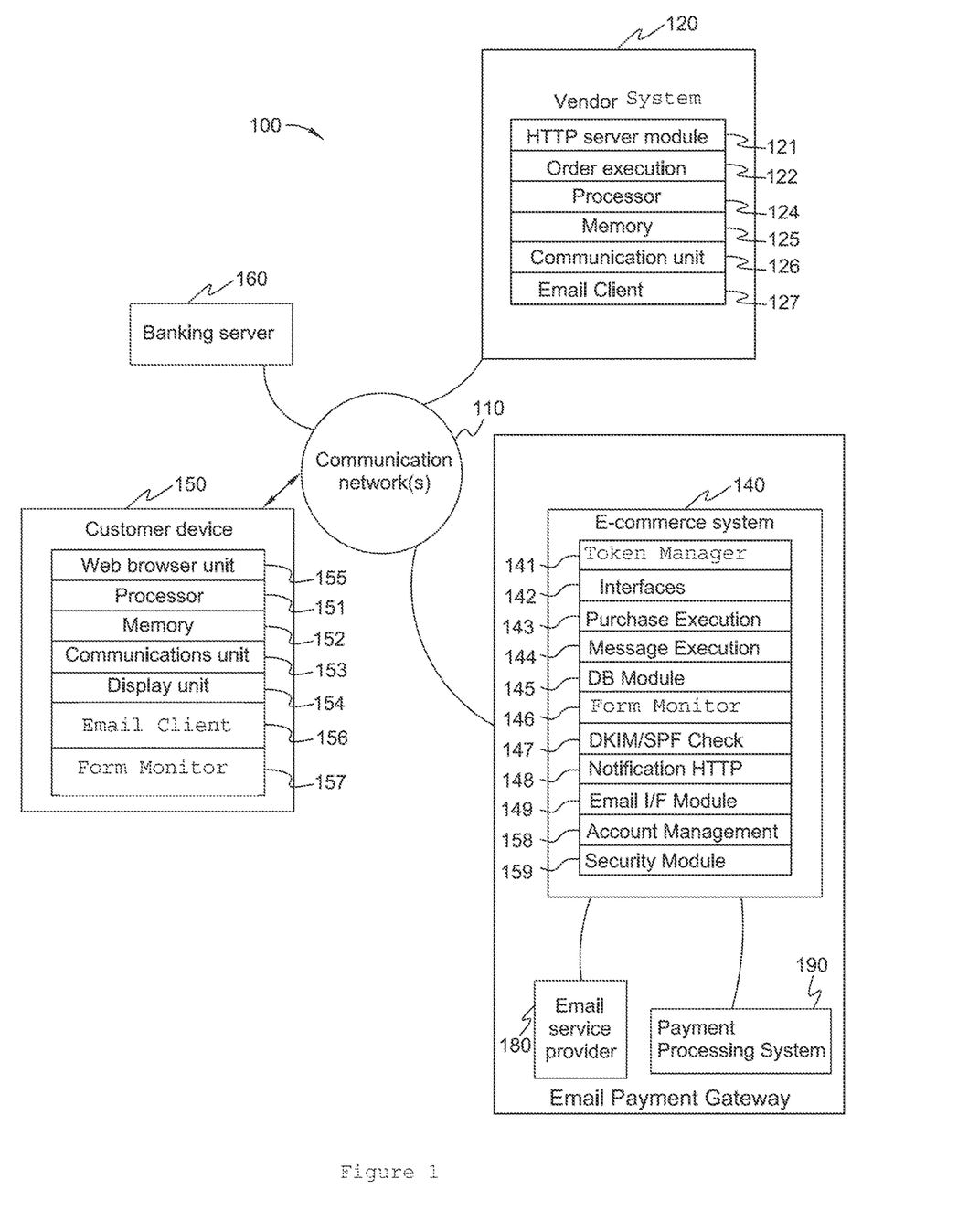
FIG. 1 shows an example of a block diagram for a system for email based e-commerce using embedded forms.

FIG. 1 shows an example system 100 that may be used for e-commerce transactions. The example system 100 includes a vendor system 120, an e-commerce system 140, a customer device 150, a banking server 160, an email service provider 180, and a payment processing system 190 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154, a web browser unit 155 that may communicate data to/from the web server module(s) in the vendor system 120 and e-commerce system 140, an email client 156, and a form monitor 157. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices that are included in, or connected to, the customer device 150, such as a liquid crystal display (LCD) display or monitor. The customer device 150 may input from the user of the customer device 150 from input devices (not depicted) that are included in, or connected to, the customer device 150, such as a keyboard, a mouse, a microphone or a touch screen, and provide data that indicates the input to the web browser unit 155.

The vendor system 120 may include an HTTP server module 121, an order execution unit 122, a processor 124, memory 125, a communications unit 126, and an email client 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor system 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an NGINX server, an APACHE HTTP server, a SUN-ONE Web Server, a MICROSOFT INTERNET Information Services (IIS) server, and/or may be based on any other appropriate HTTP server technology. The vendor system 120 may also include one or more additional components or modules (not depicted), such as one or more load balancers, firewall devices, routers, switches, and devices that handle power backup and data redundancy.

The order execution unit 122 is configured to receive instructions from received messages and executes orders on behalf of the vendor system 1220.

The memory 125 may be configured to store information associated with e-commerce transactions. This may include inventory information, information used to generate web pages, customer information, and other e-commerce data.

The communications unit 126 may be configured to transmit/receive communications via the communication network 110 or other inputs/outputs.

The email client 127 may access and manage the vendor's email. The email client 127 may be configured to communicate via the Simple Mail Transfer Protocol (SMTP) which permits any computer to send email claiming to be from any source address. SPF allows the owner of an Internet domain to specify which computers are authorized to send mail with sender addresses in that domain, using Domain Name System (DNS) records. Receivers verifying the SPF information in TXT records may reject messages from unauthorized sources before receiving the body of the message.

The e-commerce system 140 may include a token manager 141, an interfaces module 142, a purchase execution module 143, a message execution module 144, a database module 145, a form monitor 146, a DKIM/SPF Check module 147, a notification HTTP module 148, an email interface module 149, an account management unit 158 and a security module 159. While only one vendor system 120 is shown communicating with the e-commerce system 140, this is shown as an example only. The e-commerce system 140 may communicate with an internal or external email service provider 180 and an internal or external payment processing system 190. The E-commerce system 140 may communicate with multiple vendor systems 120. Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 120, and/or the email service provider 180.

The token manager 141 may generate tokens for use in e-commerce transactions. Tokens may be encrypted or plain text strings which contain information to perform a transaction when sent to the e-commerce system(s) 140. A token may be one or multiple encrypted strings, files, passwords, cyphers, plain text or other data which may contain information used to perform or authenticate a transaction. While FIG. 1 shows the token manager 141 as being a part of the e-commerce system, it may be hosted by any trusted party with access to the private key. For example, the banking server 160 may include a token manager 141. A token may include one or more of the following parameters or other parameters not listed below:

a) private-key: The private key provided by the e-commerce system 140.
b) public-key: e-commerce system's 140 public key, provided by the e-commerce system 140.
c) partner-id: The partner ID given provided by the e-commerce system 140.

d) environment: The environment the vendor wants to generate buttons for. This distinguishes whether the token is being used in a testing environment or in the live environment (and running real transactions).
e) config: The path to a configuration file in yml format. This may hold a default set of information, e.g., private_key, public_key, partner_id, and other information—so they don't have to be entered separately each time a token is generated. The configure field may also contain information specific to an offer or a customer if multiple tokens are being generated with similar components.
f) type: The type of token to generate (e.g. bulk, email-targeted, etc.). There are multiple types of tokens that a token manager may generate and decode. For example, site tokens may be used for website transactions, email tokens for two-click email payments, and universal tokens for email validations.
g) card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.
h) email: The email associated with the receipt of this token.
i) URL: The Signup URL the recipient should go to if customer doesn't have payment information registered with e-commerce system 140.
j) amount: The amount a user should be charged for the transaction the token is generated for.
k) user-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.
l) expires: Expiration date for token, integer value of seconds since epoch.
m) header-user-agent: The HTTP_USER_AGENT from the request header. HTTP headers are sent as part of a request from a customer's web browser unit 155 for a piece of information. These headers define the parameters that the web browser unit 155 is expecting to get back. The user-agent is the identifier of the software that is submitting the request—typically the identifier of the web browser unit 155 that is requesting the content.
n) header-accept-language: The HTTP_ACCEPT_LANGUAGE from the request header. The accept-language is the acceptable language for the response—e.g. the language in which the web browser unit 155 is requesting the content be sent back.
o) header-accept-charset: The HTTP_ACCEPT_CHARSET from the request header. The accept-charset is the character sets that are acceptable for the response—e.g. the character set in which the web browser unit 155 is requesting the content be sent back.
p) ip-address: The IP address of the token recipient.

In one example, a bulk token may omit the card and email fields, allowing for the tokens to be shared. Additionally, or alternatively, a bulk token may include the card field and/or email field but the e-commerce system 140 may be configured to ignore those fields and/or other fields based on the type field.

The token manager 141 may be configured to decode tokens received from external sources, such as a vendor system 120 or a customer device 150.

The interfaces module 142 serves as an interface to databases within the e-commerce system 140.

The purchase execution module 143 facilitates the execution of purchases between a customer and a vendor.

The message execution module 144 is configured to analyze received messages and communicate with the token manager 141 to determine if the received message is valid and to identify the request embedded in the message (e.g. request for purchase of goods.) If the token manager 141 indicates the token is valid, the message execution module 144 may then access the account management unit 158 to verify a transaction.

The database module 145 serves as a database to store information that may be accessed by the e-commerce system 140.

The form monitor 146 may be configured to generate, store and manage templates and interact with vendor systems and customer devices to generate embedded forms for use in email based e-commerce. The form monitor 146 may further be used when emails including embedded forms are received to authenticate and decode and/or parse the input details in the embedded forms.

The DomainKeys Identified Mail (DKIM)/Sender Policy Framework (SPF) check module 147 serves to authenticate received emails, using DKIM and/or SPF protocols. For example, SPF allows a domain owner to add a file or record on the server that the recipient server cross-checks. Similarly DKIM may be used to embed information within the email. Although DKIM/SPF has been specifically set forth, those of skill in the art would realize that other authentication protocols may be used with the teachings herein.

The notification HTTP module 148 delivers notices of events to external systems, such as an HTTP endpoint the vendor configures to update their internal database when a transaction is executed.

An email interface module 149 may be configured to parse emails for action by the e-commerce system.

The account management unit 158 is configured to manage accounts registered with the e-commerce system 140. A customer or vendor, wishing to complete a transaction with an e-commerce system 140 may register his/her email address and payment information with the e-commerce system 140. The account management unit 158 may be configured to store a customer registry and vendor registry.

The security module 159 may be configured to perform additional security measures to prevent unauthorized access to the system or fraud.

The email service provider (ESP) 180 may be associated with the vendor system 120, the e-commerce system 140, or may be a third party entity. The email service provider 180 may be configured to provide email marketing services. The email service provider 180 may further be configured to provide tracking information showing the status of email sent to each member of an address list. The email service provider 180 may further be configured to segment an address list into interest groups or categories to send targeted information. The email service provider 180 may also parse messages based on the secondary system of email targeted tokens. The ESP 180 may also be configured to send trigger emails based on responses from the vendor or customer behavior. The email service provider 180 may further be configured to create or use templates generated by the e-commerce system 140 for sending to contacts and/or the use of templates pre-made, email service provider 180 may include a user interface that allows a user to manually adjust the template or it may be integrated with external sources (e.g. vendor system 120 or e-commerce system 140). The email service provider 180 may comprise a send engine, which allows vendors to distribute their message to the customers. The ESP 180 may further include a tool for generating mailto links, graphic buttons, and tokens. The email service provider 180 may be configured to customize dynamically the content of emails that are sent out, to tailor personalized information and mailto links.

The banking server 160 may be controlled by a third party system bank. The e-commerce system 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be an interface for a centralized or decentralized virtual currency system or protocol such as frequent flyer miles, "reward" points, or Bitcoin.

The email-based e-commerce system 140 may allow vendors to send advertising emails with a mailto-link associated with a specific product offer and select the mailto-link and generate a response email by selecting the mailto-link. This response email contains a token and is addressed to the e-commerce system 140. Once sent, this response email confirms the customer's purchase of the product by parsing the information in the token. The e-commerce system 140 processes the payment and notifies the vendor and the customer. The e-commerce system 140 may comprises a token manager, components for processing the tokens and a components for processing the payments and a system for notifying the vendor system 120 of the transaction details.

Referring back to the example system in FIG. 1, the payment processing system 190 may be an independent third party operated unit, it may be located in the e-commerce system 140 or the vendor system 120.

While the example system shown in FIG. 1 shows the e-commerce system 140 comprising the token manager 141, this is shown as an example only. The vendor system 120 may also include a token manager that allows vendors to directly create tokens. In another example, a third party may have a token manager to create tokens for use by the vendor system 120.

Figure 2:
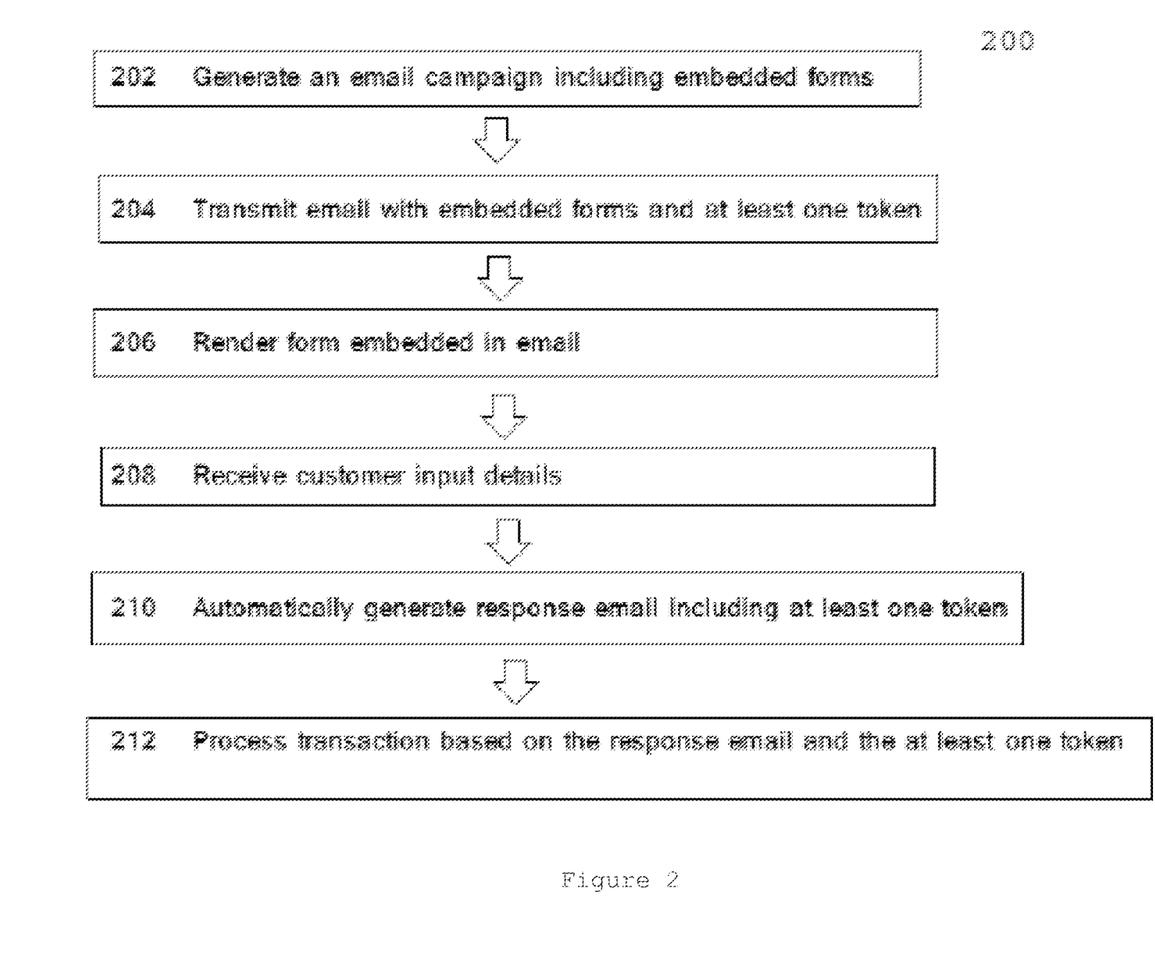
FIG. 2 is a flow diagram for a method for email based e-commerce using embedded forms.

In an effort to provide a more robust email-based e-commerce experience, vendors may embed forms within an email that allow users to select specific options for a transaction without needing to visit the vendor's website. FIG. 2 is a flow diagram for a method 200 for email based e-commerce using embedded forms. A vendor, using a control panel may generate an email campaign, wherein each email includes an embedded form (step 202). For example, the e-commerce system 140 may provide the vendor with the ability to generate emails including embedded forms by providing a graphical user interface (GUI). The GUI may allow the vendor to customize the forms. For example the GUI may present the user with numerous templates that may be customized based on the vendor's specifications. Once the form is generated, the form is embedded in one or more emails associated with an email campaign. During this process, each email is embedded with one or more tokens. As an example, for a form that includes multiple offers, each offer may be associated with a different token. The email campaign is then distributed, via email, to the intended recipient(s) (step 204). The recipient of the email may access the email via a customer device 150. When the customer device 150 is used to open the email, the email client renders the embedded form (step 206). The customer device 150 may then receive selections from the customer (step 208). Once the selections are made, the customer device 150 automatically generates a response message, including at least one token and information associated with the customer selections (step 210). This email is sent to the e-commerce system 140, which may then process the transaction (step 212).

Figure 3:
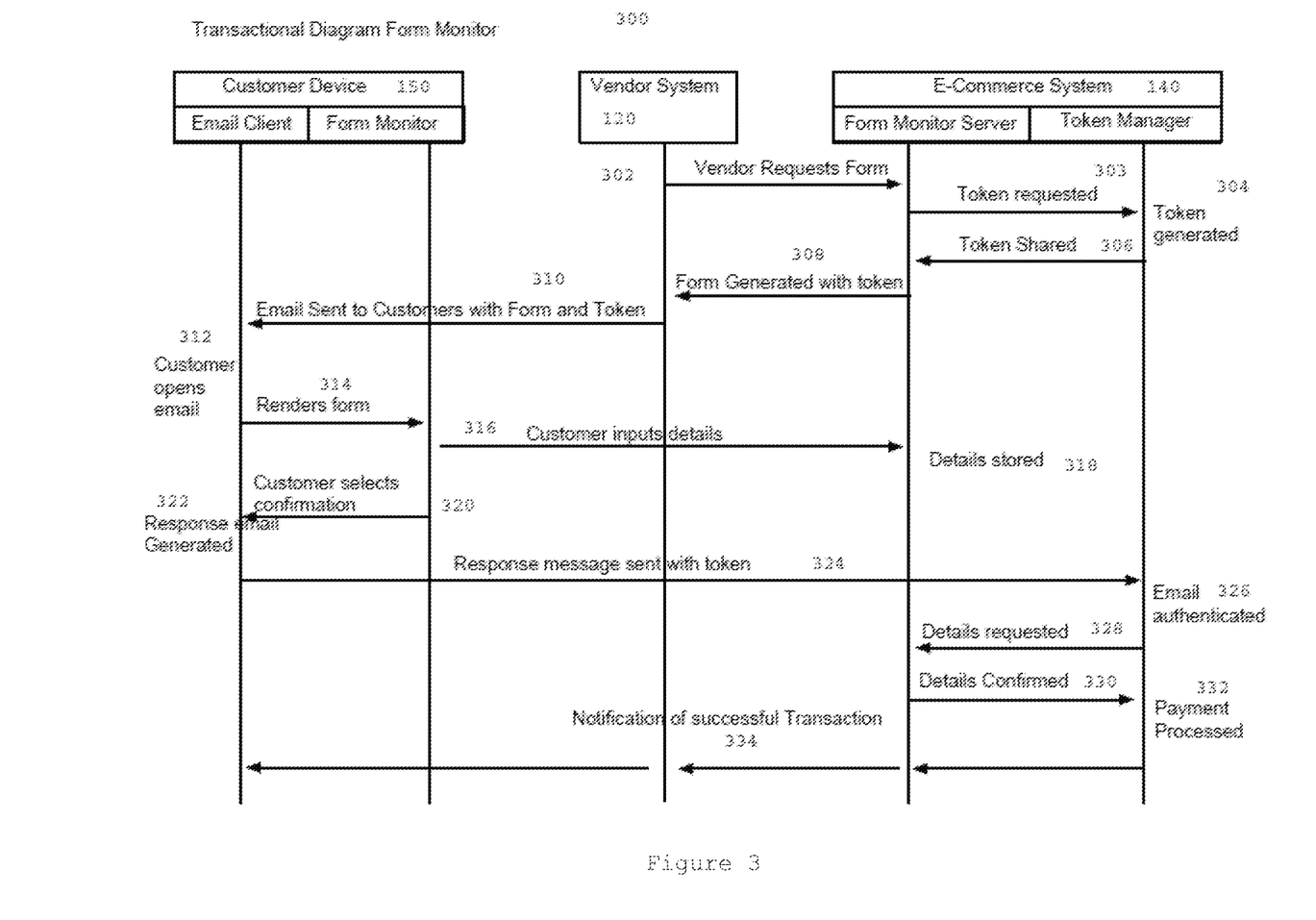
FIG. 3 is a transactional flow diagram for a method for e-commerce using a form monitor.

FIG. 3 is a transactional flow diagram for a method for e-commerce using a form monitor. In this example method, the email with embedded form is opened within a predetermined email client. When the email is opened up within the email client, the email client communicates (e.g. using HTTP protocol) with a server to provide details regarding the transaction. The transaction may be initiated upon transmission of the email. When a vendor wishes to begin an email campaign, using embedded forms, the vendor system 120 transmits a request for a form (step 302). This may be performed, for example through a GUI available to the vendor system 120, through a software app, or via a webpage. A form monitor server associated with the e-commerce system 140 may receive this request and request one or more tokens, depending on the requested form (step 303). A token manager associated with the e-commerce system 140 may then generate the tokens (step 304) and share these tokens with the form monitor server (step 306). The form monitor server may then generate a form including the token(s). This form may then be shared with the vendor system 120 (step 308). The vendor system 120 or an ESP associated with the vendor system 120 may integrate the received form(s) with embedded token(s) into an email campaign and transmit the integrated forms to customers (step 310).

The customers, using a customer device 150, may open the email (step 312). The email may be opened, e.g., in an email client such as OUTLOOK, GMAIL, etc. via a web browser or any other similar application. When the customer device 150 opens the received email, the customer device 150 may render the form within the email environment. The customer device 150 may input, e.g. through a keyboard or touchscreen, identifying selections within the rendered form, which selections may be stored by the e-commerce system 140. Once the input selections are complete, the customer is asked to confirm that the selections are complete. Upon selecting an option confirming the details within the form (step 320) a response email is generated (step 322).

The response email is then transmitted to the e-commerce system (step 324). This response email may include one or more of the tokens, which may be associated with items purchased. The e-commerce system 140 receives the response email and authenticates the response email (step 326). The token manager associated with the e-commerce system 140 may request the customer's input details (step 328). The form monitor may provide the customer's input details to the token manager (step 330). Once these details are confirmed, the e-commerce system 140 may process the payment (step 332) and notify the vendor system 120 of a successful transaction (step 334).

Figure 4:
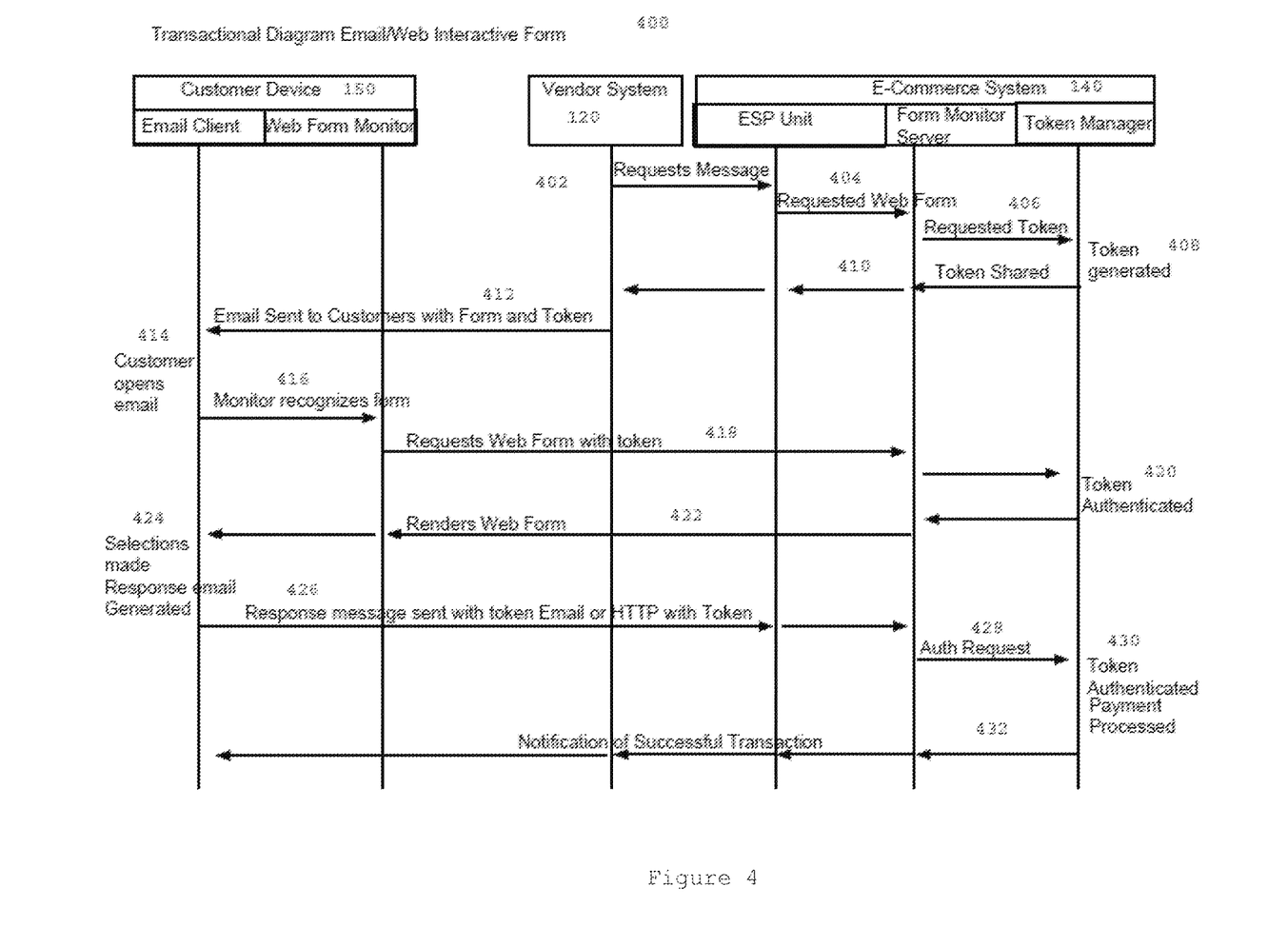
FIG. 4 is a transactional flow diagram for a method for e-commerce using an email/web interactive form.

FIG. 4 is a transactional flow diagram for a method for e-commerce using an email with an embedded web interactive form. In this example, the email client is capable of opening up a webpage that integrates the vendor's message into the functions of a webpage and uses an email to complete the transaction. When a vendor wishes to begin an email campaign, using embedded forms, the vendor system 120 transmits a request for a form (step 402). This may be performed, for example through a GUI available to the vendor system 120, through a software app, or via a webpage. An ESP associated with the e-commerce system 140 may receive this request a web form (step 404). A form monitor server may request one or more tokens, depending on the requested web form (step 406). A token manager associated with the e-commerce system 140 may then generate the tokens (step 408) and share these tokens (step 410). The form monitor server may then generate a form including the token(s). The e-commerce system 150 has the flexibility to generate the form on behalf of the vendor (including the token) or provide the vendor system 120 with the token information, and allow the vendor system 120 to generate the form. The vendor system 120 or an ESP associated with the vendor system 120 may integrate the received form(s) with embedded token(s) into an email campaign and transmit them to the customers (step 412).

The customers, using a customer device 150 may open the email (step 414). The email may be opened, e.g., in an email client such as OUTLOOK, GMAIL, etc. via a web browser or any other similar application. When the customer device 150 opens the received email, the customer device 150 recognizes that a web interactive form has been embedded (step 416). The customer device 150 may then transmit a request for additional information in the web form. This request may include one or more received tokens (step 418). The e-commerce system 140 receives and authenticates the token (step 420) and transmits information to the customer device 150 which is used by the customer device 150 to render a web form (step 422). This web form may be rendered within the email client. The customer device 150 may input, e.g. through a keyboard or touchscreen, identifying selections within the rendered web form (step 424). Once the customer has completed entry of input details into the web form, a response email is sent, including a token, identifying the customer's selections (step 426). The form monitor, associated with the e-commerce system authenticates the request (e.g. request for purchase or donation etc.) embedded, within the response email (step 428). The e-commerce system 140 may then authenticate the token and process payment (step 430). Once payment is processed, the e-commerce system 140 may notify the vendor system 120 of a successful transaction (step 432).

In this example, the design of the email client 156 enables integration of web-based viewing of email messages on a URL address and vendor URL addresses. A customer registers may register with an email account using the email client 156. This email client 156 opens and allows correspondence like a standard email client but with additional functions that allow payments and secure transactions within the email client 156.

In this example, the email client 156 includes enhanced features that allow customers and vendors to build URL pages with specific messages and offers that may be viewed and filled out by other customers/users using the email client 156 with enhanced features. A vendor wishing to email a customer an offer and a specific message may open the email client 156 and may be offered a series of web-forms that are associated with an URL address. The web-forms may vary based on the desired functionality. In one example the web form may include separate fields for a message, product picture, price of each item and a quantity. The email client 156 with enhanced features may be a standalone application or within a web browser environment, it allows a customer device 150 to display their emails on a web browser type environment and the online page loads the message and the interactive features are available but are viewed within the email client 156. The authentication of the email client 156 serves to authenticate the connection to the web-page. When the email arrives at the email client 156 and the customer device 150 opens it the email, the email client 156 recognizes it as embedded form from a particular e-commerce system 150, reads the address and redirected to a web-page that recognizes the customer and loads the text for that customer along with the interactive features.

FIGS. 5-9 show example electronic pages that may be displayed by a web browser unit, email client, or other app associated with a customer device 150. As will be described in detail below, the electronic pages may include display elements which allow customers to complete email based financial transactions utilizing one or more emails. The electronic pages may be included in a web browser window that is displayed and managed by the web browser unit 155 or email client 156. The electronic pages may include data received by the web browser unit 155 or email client 156 from the e-commerce system 140. The electronic pages may include payment transaction information.

If viewed in a web browser, the web browser window may include a control area that includes a back button, forward button, refresh button, home button, and address field (not pictured). The control area may also include one or more additional control elements, such as bookmark page etc. A customer using a customer device 150 may select the control elements in the control area. The selection may be performed, for example, by clicking a mouse or providing input via keyboard, touch screen, and/or other type of input device. When one of the control elements is selected, the web browser unit 155 may perform an action that corresponds to the selected element. For example, when the refresh button is selected, the web browser unit 155 may refresh the page currently viewed in the web browser window.

FIG. 5 is an electronic page 500 for requesting payment. As shown in FIG. 5, the electronic page may include multiple input fields 501-513. A user may access the electronic page 500 using a customer device 150, such as a laptop, smartphone, tablet, or other computer. As the customer device 150 receives input for the input fields 501-513, the customer device 150 may store one or more data structures that reflect the selections made in the input fields. As shown in FIG. 5, the input fields 501-513 may comprise a delete field 501, a reply field 502, a reply all field 503, a forward field 504, a new message field 505 and a get message field 506. Electronic page 500 may also include an inbox field 507, a request payment field 508, a lists field 509, a drafts field 510, a sent field 511 and a trash field 512. These input fields may be represented, in the electronic page as buttons. The electronic page 500 may also include an email display field 513, which allows users to select emails to view. By selecting the request payment field 508, the user may provide a user with an electronic page to create an email with an embedded form. Further, as the selections are updated, the customer device 150 may update the electronic page 500 to indicate additional, or more specific, questions that may be associated with the selections.

Figure 6:
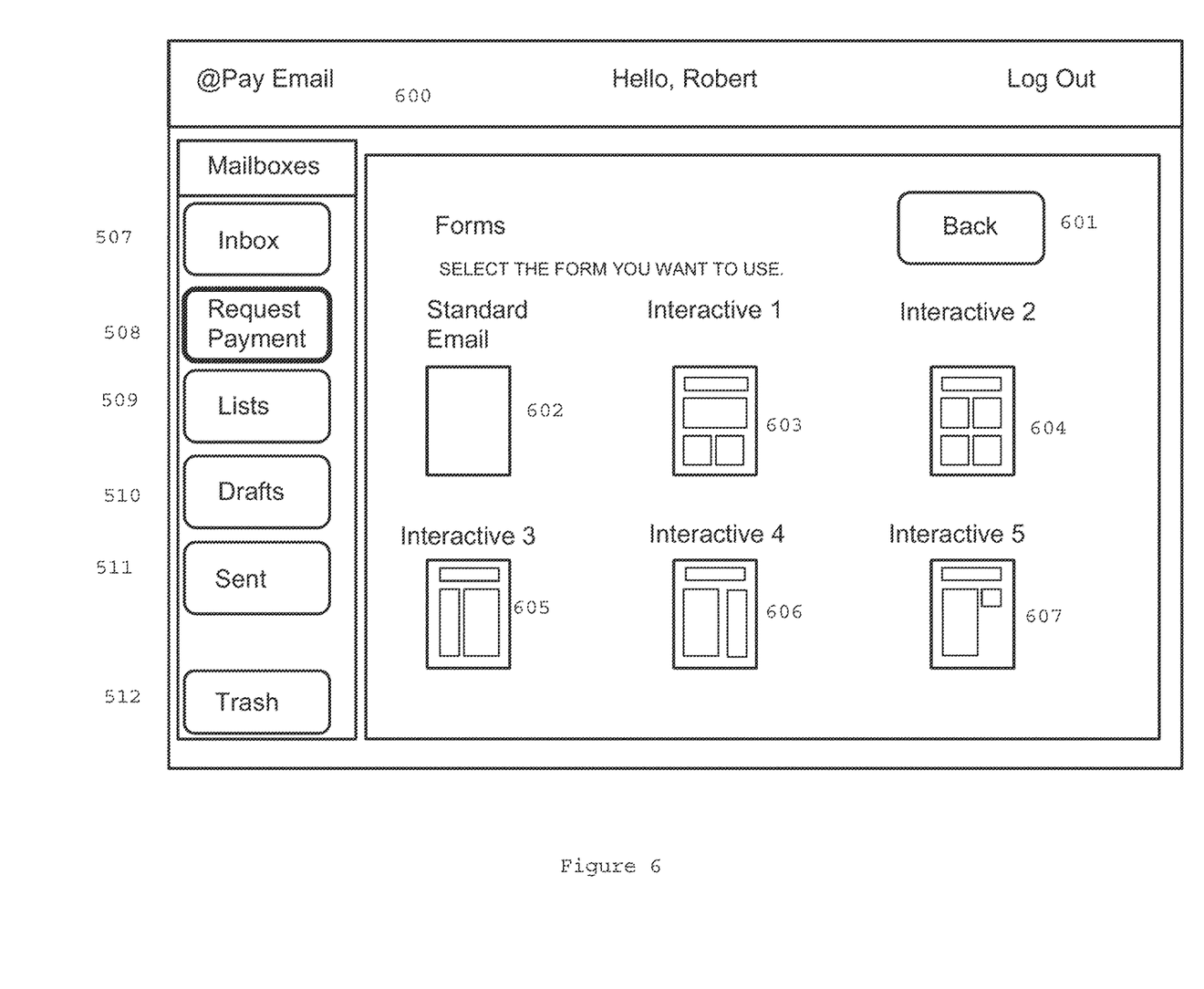
FIG. 6 is an electronic page for selecting templates for an email with an embedded form

FIG. 6 is an electronic page 600 for selecting templates for an email with an embedded form. As shown in FIG. 6, the electronic page may include multiple input fields 507-512 and 601-607. When a user, accessing electronic page 500 selects the request payment field 508, the customer device 150 may take the user to electronic page 600. As the customer device 150 receives input for the input fields 507-512 and 601-607, the customer device 150 may store one or more data structures that reflect the selections made in the input fields. As shown in FIG. 6, the input fields 501-507 may comprise a back field 601 (which allows the user to return to electronic page 500), and multiple templates for a payment request email including input fields 602-608. Selecting input field 602 will generate a standard email to be used to request payment. Selecting input fields 603-607 may allow the user to generate an email including an interactive embedded form, as described herein. Further, as the selections are updated, the customer device 150 may update the electronic page 600 to indicate additional, or more specific, questions that may be associated with the selections.

Figure 7:
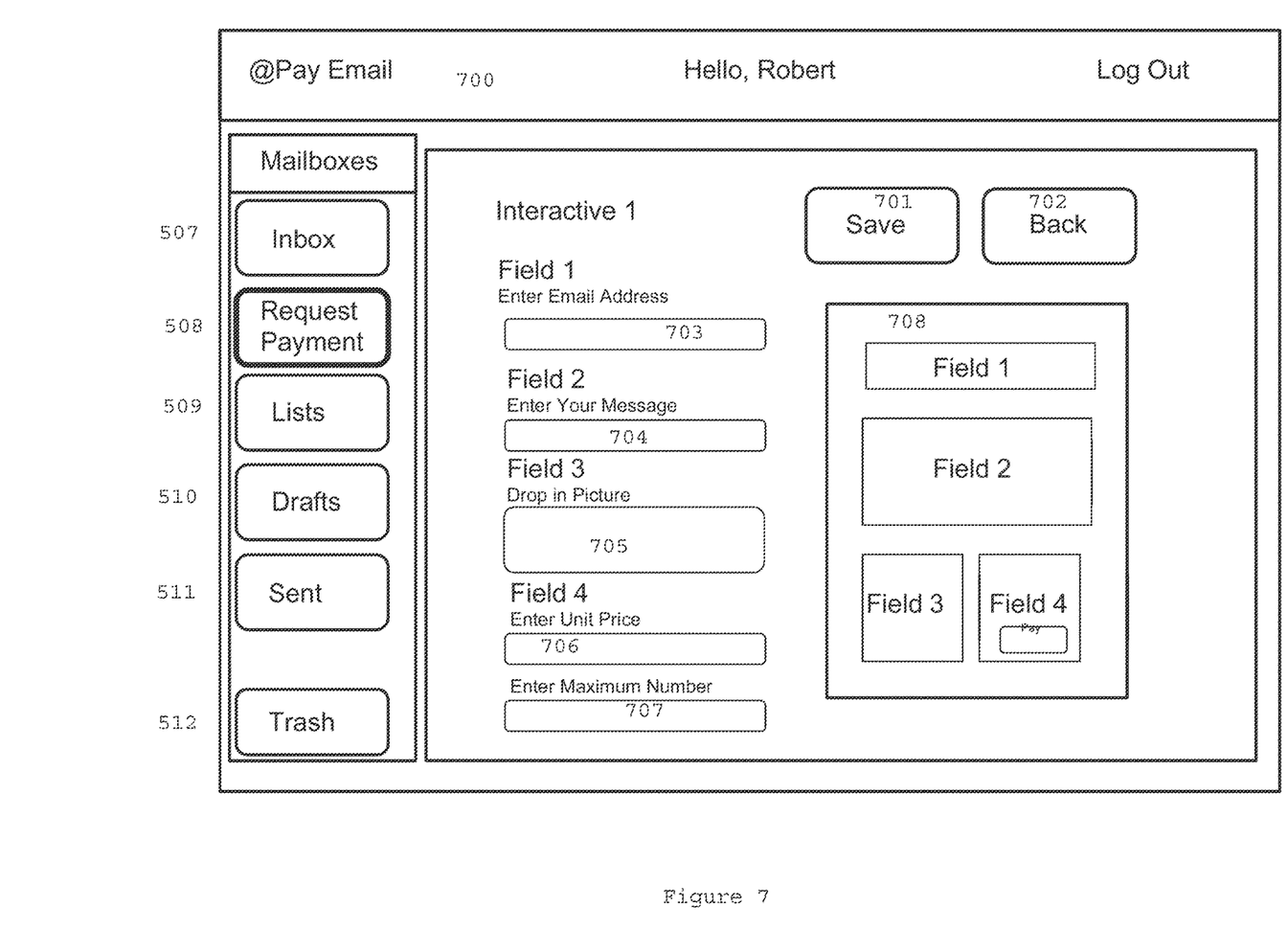
FIG. 7 is an electronic page for customizing a template for an email with an embedded form.

FIG. 7 is an electronic page 700 for customizing a template for an email with an embedded form. As shown in FIG. 7, the electronic page may include multiple input fields 507-512 and 701-708. When a user, accessing electronic page 600 selects an input field 603-607 to generate an interactive embedded form, the customer device 150 may take the user to electronic page 700. As the customer device 150 receives input for the input fields 507-512 and 701-708, the customer device 150 may store one or more data structures that reflect the selections made in the input fields. As shown in FIG. 7, electronic page 700 may comprise a save field 701 (which allows the user the option to save a template that is in progress) and back field 702 (which allows the user to return to electronic page 600). Electronic page 700 may also include multiple fields for entering information into the template, including fields 703-707. For example, this may include fields for entering email addresses, messages, pictures, unit price, and maximum number of units available. Electronic page 700 may also include a thumbnail view 708 of the template that allows users to move and adjust the positioning of each field. Further, as the selections are updated, the customer device 150 may update the electronic page 700 to indicate additional, or more specific, questions that may be associated with the selections.

Figure 8:
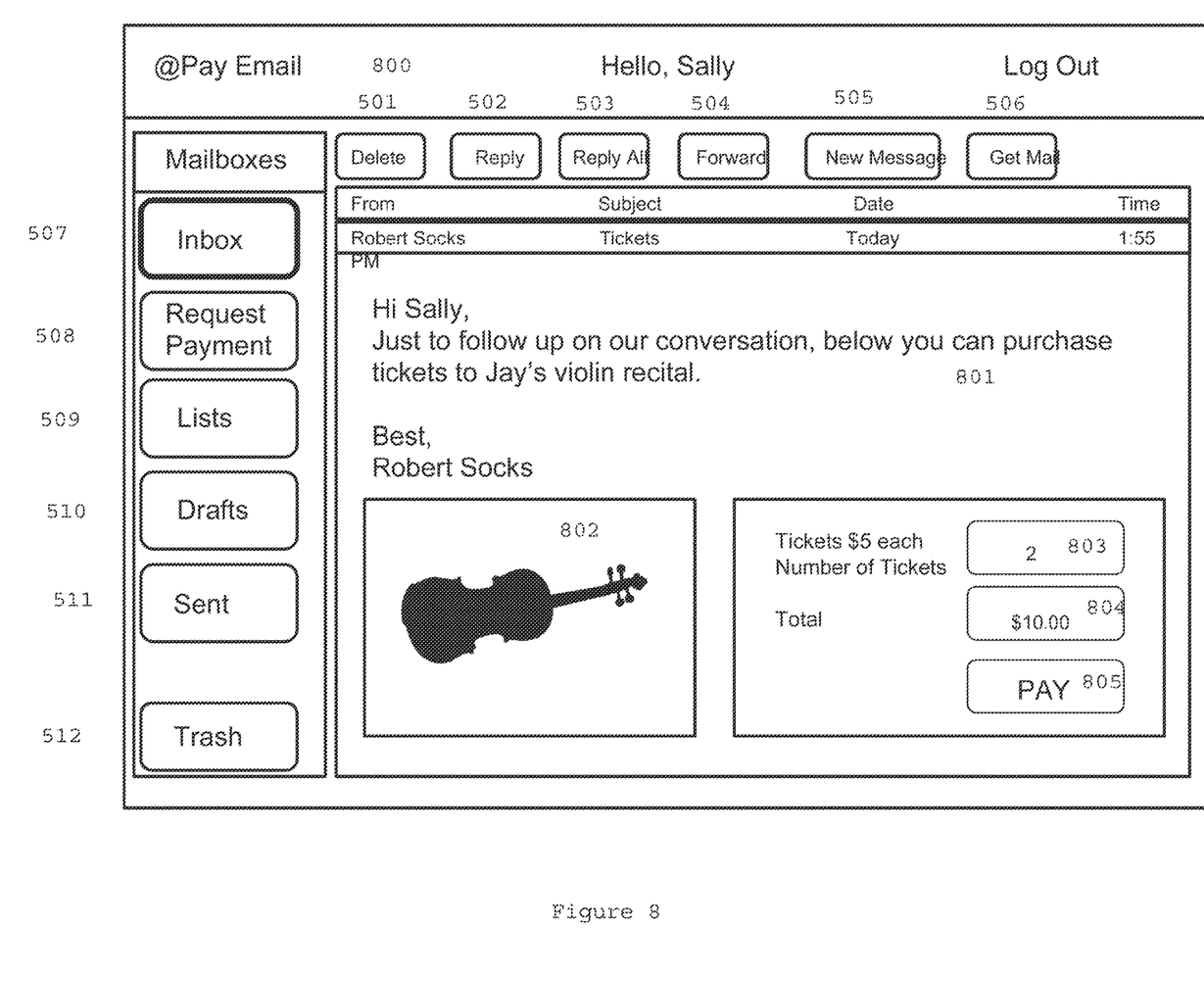
FIG. 8 is an electronic page including an email with an embedded form.

FIG. 8 is an electronic page 800 including an email with an embedded form. As shown in FIG. 8, the electronic page may include multiple input fields 501-512 and 803-805. A customer device 150, using an email client may access the user's email. The customer device 150 may display an email with an embedded form. As shown in FIG. 8, the electronic page 800 includes a message field 801 and a picture 802. As the customer device 150 receives input for the input fields 501-512 and 803-805, the customer device 150 may store one or more data structures that reflect the selections made in the input fields. As shown in FIG. 8, electronic page 800 may comprise a tickets field 803 (which allows the user to select the number of tickets for purchase.) In one example, the customer device 150 may be configured to automatically fill in input field 804 based on the amount entered into input field 803. In another example, the customer may be able to bargain or bid on the price by entering an amount into input field 804. By selecting input field 805, the customer can begin the process to pay for the transaction. Further, as the selections are updated, the customer device 150 may update the electronic page 800 to indicate additional, or more specific, questions that may be associated with the selections. By selecting input field 805, the customer device 150 may then generate a response email message that requests purchase of the selected item(s) at the selected quantity.

As an example, a customer device 150 that is registered with the e-commerce system 140 may download an application that is an email client that organizes emails. Alternatively or additionally, the customer device 150 may use a web-based email client 156. This email client 156 may be specially configured to identify communicate using emails including embedded forms. The email client associated with the customer device 150 monitors incoming emails for an embedded form generated by the ecommerce system 140. When an email containing an embedded form is selected, the email client 156 recognizes the form and communicates changes made to the form to the form monitor 146 on the e-commerce system 140. The email may include more than one embedded form. In this example shown in FIG. 8, the customer may select the amount of a product to purchase. If the customer selects an option in input field 800, e.g. the number two, (e.g. from a drop down list embedded in the form), the email client 156 notifies the form monitor 146 the quantity the customer is requesting. If the customer changes the quantity, the email client 156 notifies the vendor system 120 of the change. When the customer selects the confirmation link in input field 805, an email is generated that is addressed to the ecommerce system 140. When the customer device 150 sends the email, the e-commerce system 140 receives the email and the email is authenticated and the commerce system notifies the vendor that the order is authorized form that email address using this form. The e-commerce system 140 may look-up the customer's form information on the form monitor 146. Once the information is retrieved the payment is processed and the vendor system 120 is notified. While the form monitor 146 is shown, in FIG. 1 as being a part of the e-commerce system 140, alternatively, it may be located in the vendor system 120 and may communicate directly with an inventory program. The completion of the transaction may happen by an http message instead of an email response. The email client 156 may accept multiple forms of messaging such as social media and SMS. The email client 156 may use different methods to confirm transactions for better security.

Figure 9:
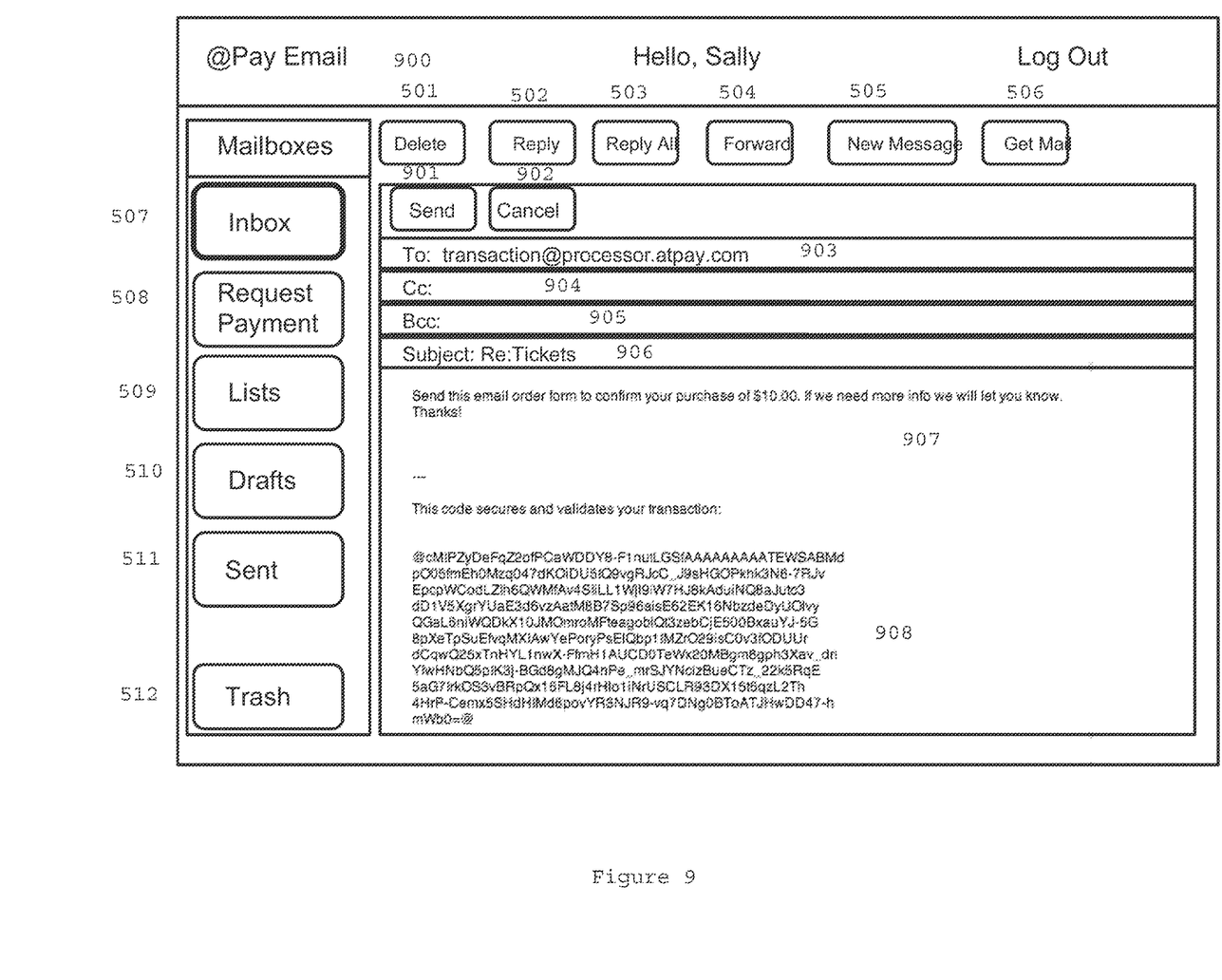
FIG. 9 is an electronic page including a response email.

FIG. 9 is an electronic page 900 including a response email. As shown in FIG. 9, the electronic page may include multiple input fields 501-512 and 901-907. Once a customer, using a customer device 150 has selected input field 805 from electronic page 800, they may be taken to electronic page 900. As shown in FIG. 9, the electronic page 900 includes a send field 901, a cancel field 902, a To: field 903, a Cc: field 904, a Bcc: field, a subject field 906 and a message body field 907. As the customer device 150 receives input for the input fields 501-512 and 901-907, the customer device 150 may store one or more data structures that reflect the selections made in the input fields. Based on information entered into electronic page 800, the customer device 150 may automatically insert input data into input fields 903-907. By automatically generating a reply message based on information entered into the embedded form, the customer may seamlessly and quickly respond to requests for payment, such as donations or sales. As shown in FIG. 9, message body field 907 also includes an example encrypted token 908. This is shown as an example only. The token may be an image or other file; additionally it may be embedded in fields 903-906.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BLURAY-Disc, or other type of device for electronic data storage.

Although the methods and features described above with reference to FIGS. 2-9 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-9 may be used alone without the other features and elements or in various combinations with or without other features and elements. Sub-elements of the methods and features described above with reference to FIGS. 1-9 may be performed in any arbitrary order (including concurrently), in any combination or sub-combination.

What is claimed is:

1. A customer device that utilizes Simple Mail Transfer Protocol (SMTP) to facilitate e-commerce transactions, the customer device comprising:
   a communication interface that is communicatively coupled to an e-commerce system;
   a display;
   an input device; and
   a processor that is communicatively coupled to the communication interface, the display and the input device;
   wherein the processor is configured to:
   receive, using an email client, an SMTP Simple Mail Transfer Protocol email that includes an embedded form and at least one token via the communication interface, wherein each of the at least one token includes at least a type field and amount field for one of a plurality of items offered for sale, wherein the embedded form further includes input fields that enable a customer to directly enter additional information into the embedded form;
   determine that the SMTP email is associated with the e-commerce system and that the SMTP email includes the embedded form;
   render, using the display, the embedded form within an email environment;
   receive, using the input device, the additional information into input fields of the embedded form;
   transmit, using the email client, the additional information to the e-commerce system via the communication interface;
   transmit, using the email, a SMTP response email via the communication interface, wherein the response email includes the additional information and particular tokens associated with each item from the plurality of items that the customer has selected to purchase; and
   receive, using the email client, a notice indicating that a transaction has been processed via the communication interface.

2. The customer device of claim 1, wherein the embedded form is a web form.

3. The customer device of claim 2, wherein the processor is further configured to render the web form by communicating with a vendor website via HTTP.

4. The customer device of claim 1, wherein the processor is further configured to render the embedded form on the display by communicating with a form monitor associated with the customer device.

5. The customer device of claim 1, wherein the input device is a touchscreen.

6. The customer device of claim 1, wherein the email client is accessed via a web page.

7. The customer device of claim 1, wherein the email client is registered with the e-commerce system.

8. The customer device of claim 1, wherein the token is embedded in a message.

9. A non-transitory computer readable storage medium that stores instructions for utilizing Simple Mail Transfer Protocol (SMTP) to facilitate e-commerce transactions, the instructions when executed by a processor of a mobile device cause the processor to:
   receive, using an email client, an SMTP Simple Mail Transfer Protocol email that includes an embedded form and at least one token, wherein each of the at least one token includes at least a type field and amount field for one of a plurality of items offered for sale, wherein the embedded form further includes input fields that enable a customer to directly enter additional information into the embedded form;
   determine that the SMTP email is associated with an e-commerce system and that the SMTP email includes the embedded form;
   render, using a display, the embedded form within an email environment;
   receive, using an input device, the additional information into input fields of the embedded form;
   transmit, using the email client, the additional information to the e-commerce system;
   transmit, using the email, a SMTP response email that includes the additional information and particular tokens associated with each item from the plurality of items that the customer has selected to purchase; and
   receive, using the email client, a notice indicating that a transaction has been processed.

10. The non-transitory computer readable storage medium of claim 9, wherein the embedded form is a web form.

11. The non-transitory computer readable storage medium of claim 10, wherein the instructions further cause the processor to render the web form by communicating with a vendor website via HTTP.

12. The non-transitory computer readable storage medium of claim 9, wherein the instructions further cause the processor to render the embedded form on the display by communicating with a form monitor associated with the mobile device.

13. The non-transitory computer readable storage medium of claim 9, wherein the input device is a touchscreen.

14. The non-transitory computer readable storage medium of claim 9, wherein the email client is accessed via a web page.

15. The non-transitory computer readable storage medium of claim 9, wherein the email client is registered with the e-commerce system.

16. The non-transitory computer readable storage medium of claim 9, wherein the token is embedded in a message.

* * * * *